United States Patent [19]

Kawakubo

[11] Patent Number: 5,233,595

[45] Date of Patent: Aug. 3, 1993

[54] OPTICAL PICKUP INCLUDING WAVEGUIDE LIGHT INTENSITY DETECTION MEANS FOR CONTROLLING A POSITION/INTENSITY OF A SEMICONDUCTOR LASER

[75] Inventor: Isao Kawakubo, Tokyo, Japan

[73] Assignee: Olympus Optical Co., Ltd., Tokyo, Japan

[21] Appl. No.: 778,253

[22] Filed: Oct. 17, 1991

[30] Foreign Application Priority Data

Oct. 24, 1990 [JP] Japan .................................. 2-284428
Jan. 31, 1991 [JP] Japan ..................................... 3-31707

[51] Int. Cl.$^5$ ............................................. G11B 7/125
[52] U.S. Cl. ..................... 369/116; 369/112; 369/122; 369/44.12
[58] Field of Search ............... 369/112, 116, 122, 109, 369/76, 44.12; 250/205; 385/129, 130, 131, 132, 14, 31

[56] References Cited

U.S. PATENT DOCUMENTS

| | | | |
|---|---|---|---|
| 4,718,052 | 1/1988 | Kondo et al. | 369/44 |
| 4,737,946 | 4/1988 | Yamashita et al. | 369/122 |
| 4,779,259 | 10/1988 | Kono et al. | 369/112 |
| 4,861,128 | 8/1989 | Ishikawa et al. | 369/122 |
| 4,887,255 | 12/1989 | Handa et al. | 369/112 |
| 4,893,296 | 1/1990 | Matsumoto et al. | 369/112 |

OTHER PUBLICATIONS

The Institute of Electronics, Information and Communication Engineers, 1986/5, vol. J69-C, pp. 609–615.

Primary Examiner—Paul M. Dzierzynski
Assistant Examiner—Jim Beyer
Attorney, Agent, or Firm—Frishauf, Holtz, Goodman & Woodward

[57] ABSTRACT

An optical pickup comprises a substrate, an optical waveguide formed on the substrate, a semiconductor laser attached to the optical waveguide, and a grating formed on the optical waveguide and converging a waveguide light in the optical waveguide to an optical recording medium. On the substrate, there are provided a first light detector for detecting the waveguide light reflected from the optical recording medium, and a second optical detector for detecting the intensity of the waveguide light being guided in the optical waveguide. The quantity of laser beam light emitted from the semiconductor laser is controlled to be constant based on an intensity signal detected by the second light detector.

7 Claims, 5 Drawing Sheets

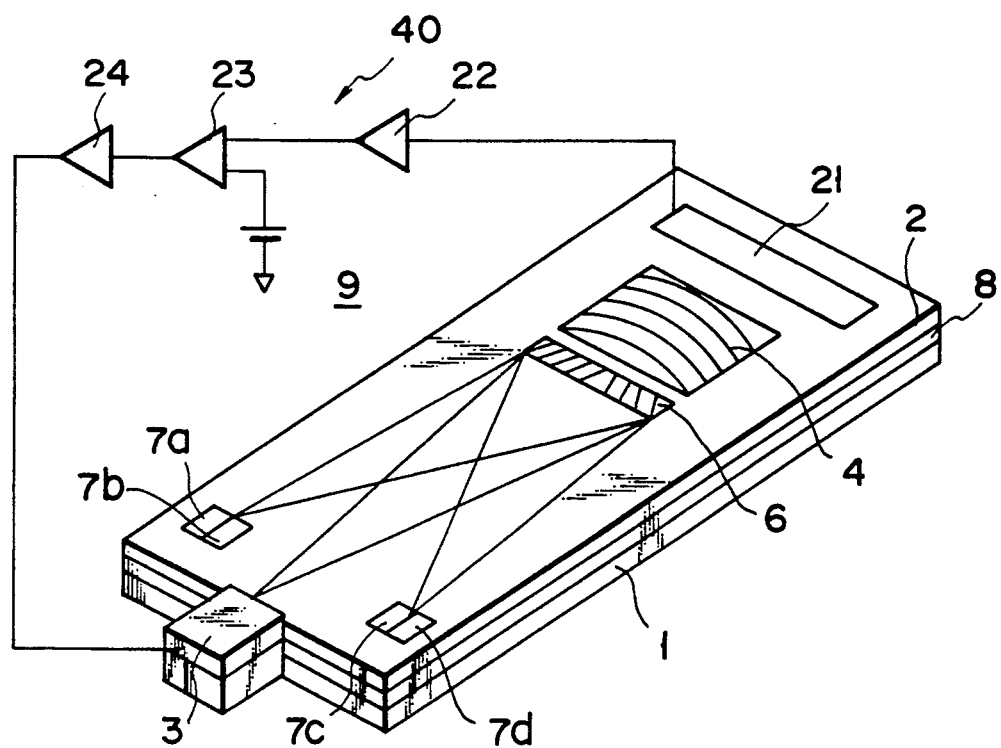
F I G. 7
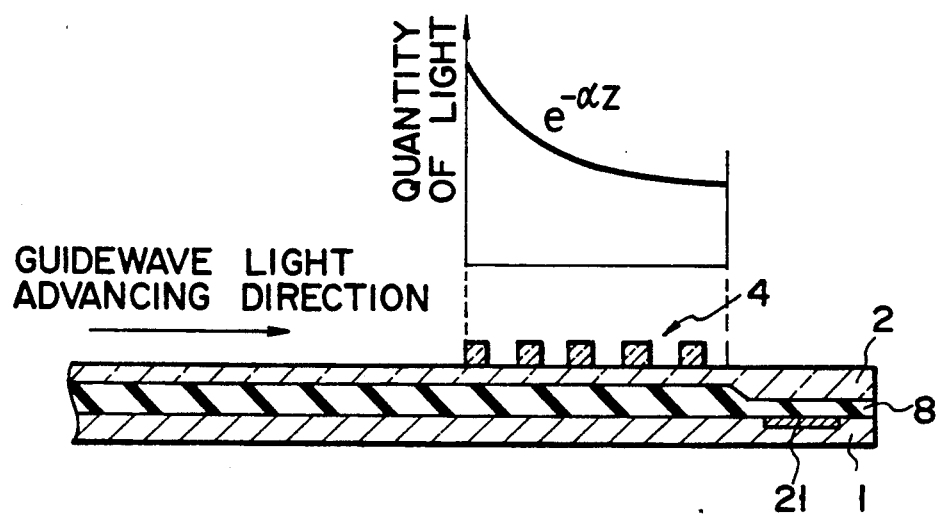
F I G. 8

OPTICAL PICKUP INCLUDING WAVEGUIDE LIGHT INTENSITY DETECTION MEANS FOR CONTROLLING A POSITION/INTENSITY OF A SEMICONDUCTOR LASER

BACKGROUND OF THE INVENTION 1. Field of the Invention

This invention relates to an optical pickup which records a signal in an optical data recording medium and/or reproduces the recorded signal.

2. Description of the Related Art

A conventional optical pickup is assembled by use of individual parts such as an objective lens, a prism, a semiconductor laser, an optical detector, and the like. In such a conventional optical pickup, the lower limitation of the respective parts is determined in terms of an operation in assembling and accuracy of positioning. There is needed a mechanism for adjusting mutual positioning. As a result, there is a disadvantage in the prior art that the size of the optical pickup cannot be made very small.

In order to solve the above problem, there has been proposed a technique in which the optical pickup is integrated by use of an optical waveguide and a grating coupler. For example, there is known an integrated optical detection device for an optical disk pickup disclosed in the paper of the Institution of Electronics Information and Communication Engineers of Japan published in 1986, Vol. 5, J69-C No. 5, P 609-P615. The conventional integrated optical pickup will be explained with reference to FIGS. 1 to 3.

FIG. 1 is a perspective view of the integrated optical pickup; FIG. 2A is a view of the integrated optical pickup of FIG. 1; and FIG. 2B is a view showing a state in which a semiconductor laser and an optical waveguide are coupled. On an Si substrate 51, there is formed an $SiO_2$ buffer layer 58 having a refractive index of 1.46 to 1.47. Glass having refractive index of 1.55 is deposited on the surface of the buffer layer 58, whereby an optical waveguide 52 is formed. The optical waveguide 52 is shaped in a form of a thin film having a thickness of about 1 micron.

On the optical waveguide 52, there are formed a beam splitter 56 and a grating coupler 54 in its rear end side. Light receiving elements 57a, 57b and 57c, 57d which are respectively divided into two, are formed on both right and left sides of the front end portion on the Si substrate 51. In the front edge portion of the optical waveguide 52, there is arranged a semiconductor laser 53, which is fixed to a support member 53b. A thickness of an active layer 53a, which emits a laser beam of the semiconductor laser 53, is thinner than that of the optical waveguide 52, that is, about 0.1 micron.

The graph of FIG. 3 shows a coupling efficiency between conventional optical waveguides which are arranged to face each other. In this FIGURE, Λ shows a shift distance in the upper and lower directions between the optical waveguides, and La shows a shift distance in the contact direction of the contact surfaces between the optical waveguides. From this graph, it can be understood that a suitable coupling efficiency can be obtained when $Λ=0$ μm and $La=0$ μm. This result can be applied to a case in which the laser beam is incident into the optical waveguide from the active layer of the semiconductor laser.

The function of the integrated optical pickup will now be briefly explained.

The laser beam emitted from the semiconductor laser 53 is incident into the optical waveguide 52 from the end surface thereof, and transmitted through the optical waveguide 52 as the total reflection is repeated on the boundary surface between an air layer 9 and the buffer layer 58. Then, the laser beam is focused on the optical recording medium 5 through the beam splitter 56 and the grating coupler 54. The reflected light sent from the optical recording medium 5 is converged to the light receiving elements 57a, 57b and 57c, 57d as the total reflection is again repeated in the optical waveguide 52 through the grating coupler 54 and the beam splitter 56. Then, a focusing control and a tracking control of the integrated optical pickup are performed based on the signal detected by the light receiving elements 57a to 57d.

As mentioned above, there is proposed a technique in which the optical pickup is integrated and miniaturized, thereby reducing the weight. However, the above-mentioned technique has the following disadvantages.

Since the incidence of the laser beam from the semiconductor laser to the optical waveguide is performed on the end surface of the optical waveguide, the coupling efficiency largely depends on the state of the end surfaces. As mentioned above, since the thickness of the optical waveguide and that of the active layer of the semiconductor laser are 1 micron and 0.1 micron, respectively, it is difficult to adjust the optical waveguide and the active layer to be correctly coincident with each other in the upper and lower directions. Moreover, regarding the contact direction of the contact surfaces between the active layer and the optical waveguide, there is slightly generated a difference in assembling. Such a difference between the active layer and the optical waveguide generates a large change in the coupling efficiency as shown in the graph of FIG. 3. Therefore, if the coupling efficiency changes, the light emitted from the grating naturally changes.

In general, recording and reproducing characteristics in the optical recording medium largely depend on the quantity of light to be emitted to the recording medium. Due to this, it is required that the quantity of light to be emitted to the recording medium has sufficient density. Therefore, if there is generated a slight difference in the coupling state between the active layer of the semiconductor laser and the optical waveguide, the quantity of light, which is emitted from the grating to the recording medium, becomes insufficient, and an unfavorable influence is exerted on the recording and reproducing characteristics. Due to this, in the conventional technique, there is required extremely strict positioning accuracy between the semiconductor laser and the optical waveguide.

Moreover, it is known that the quantity of light emission of the semiconductor laser changes responsive to temperature changes and the passage of time. Due to the change of the quantity of light emission of the semiconductor laser, the quantity of light of the laser beam from the grating to the recording medium becomes unstable, so that an unfavorable influence is exerted on the recording and reproducing characteristics. In the above-mentioned conventional technique, there is no disclosure of any measures to be taken against the change of the quantity of light of beam.

SUMMARY OF THE INVENTION

An object of the present invention is to improve the allowable degree of positioning error against an optical waveguide of a semiconductor laser, and to reduce difficulty of manufacturing an integrated optical pickup.

Further, an object of the present invention is to provide an integrated optical pickup which can correct the quantity of light emission of a semiconductor laser to be constant immediately even if the quantity of light emission of the semiconductor laser changes due to a change of temperature and the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a perspective view showing a second embodiment of the integrated optical pickup of the present invention;

FIG. 8 is a side view showing the optical pickup of FIG. 7 and shows attenuation of the quantity of light by a grating coupler;

DETAILED DESCRIPTION OF THE PREFERRED EMBODIMENTS

Embodiments of the present invention will be explained with reference to the drawings.

Figure 1:
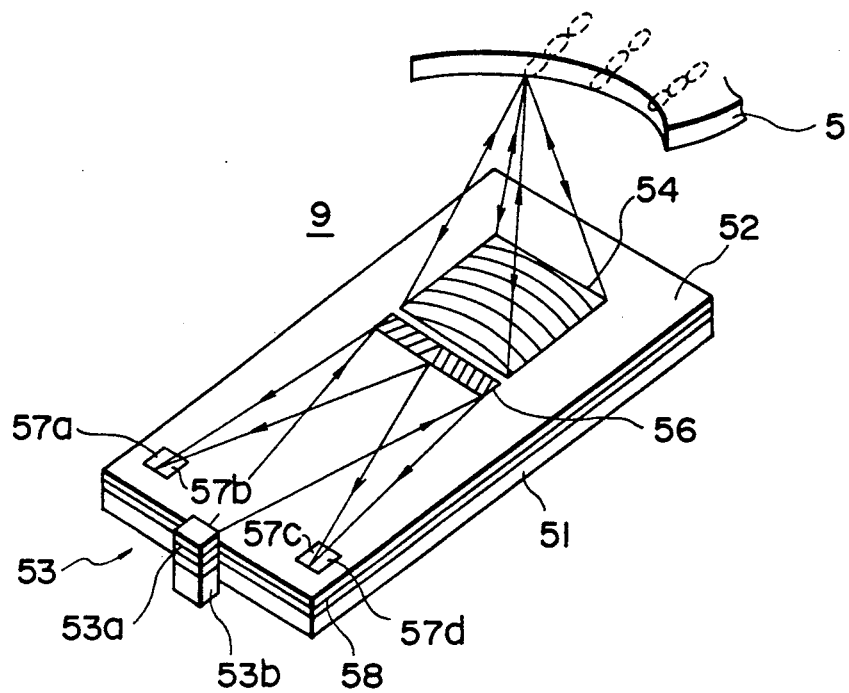
FIG. 1 is a perspective view showing a conventional integrated optical pickup.
Figure 2A:
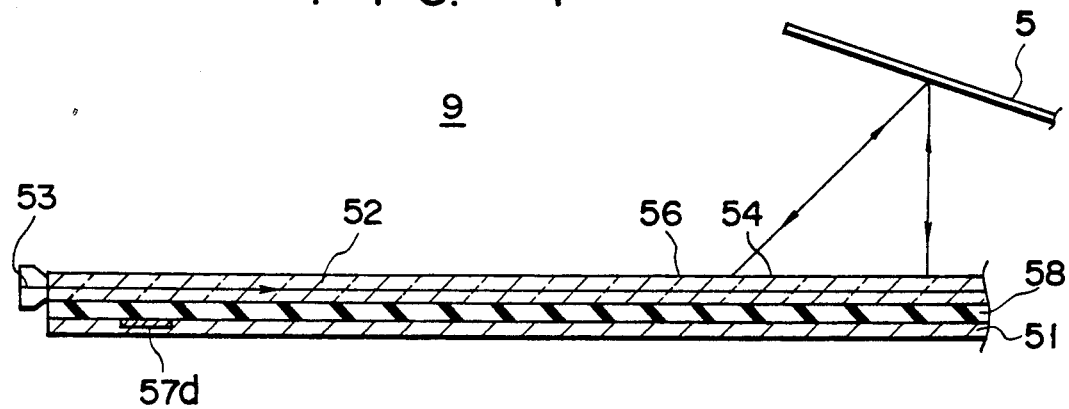
FIG. 2A is a side view showing the optical pickup shown in FIG. 1.
Figure 2B:
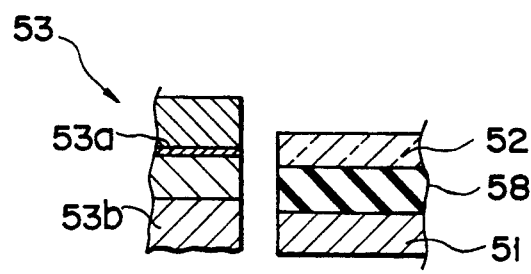
FIG. 2B is an enlarged cross sectional view showing portions of a semiconductor laser and an optical waveguide of the pickup shown in FIG. 1.
Figure 3:
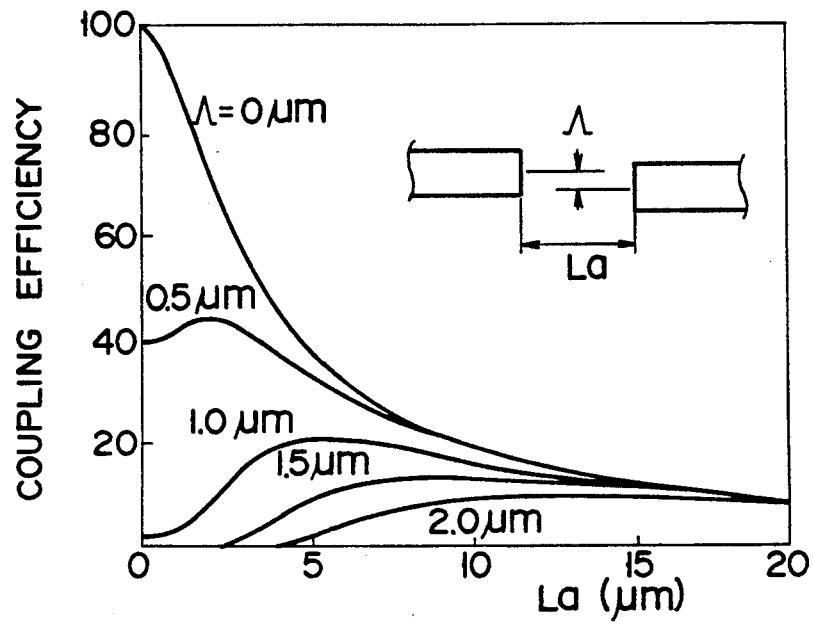
FIG. 3 is a graph showing a coupling efficiency between the optical waveguides.
Figure 4:
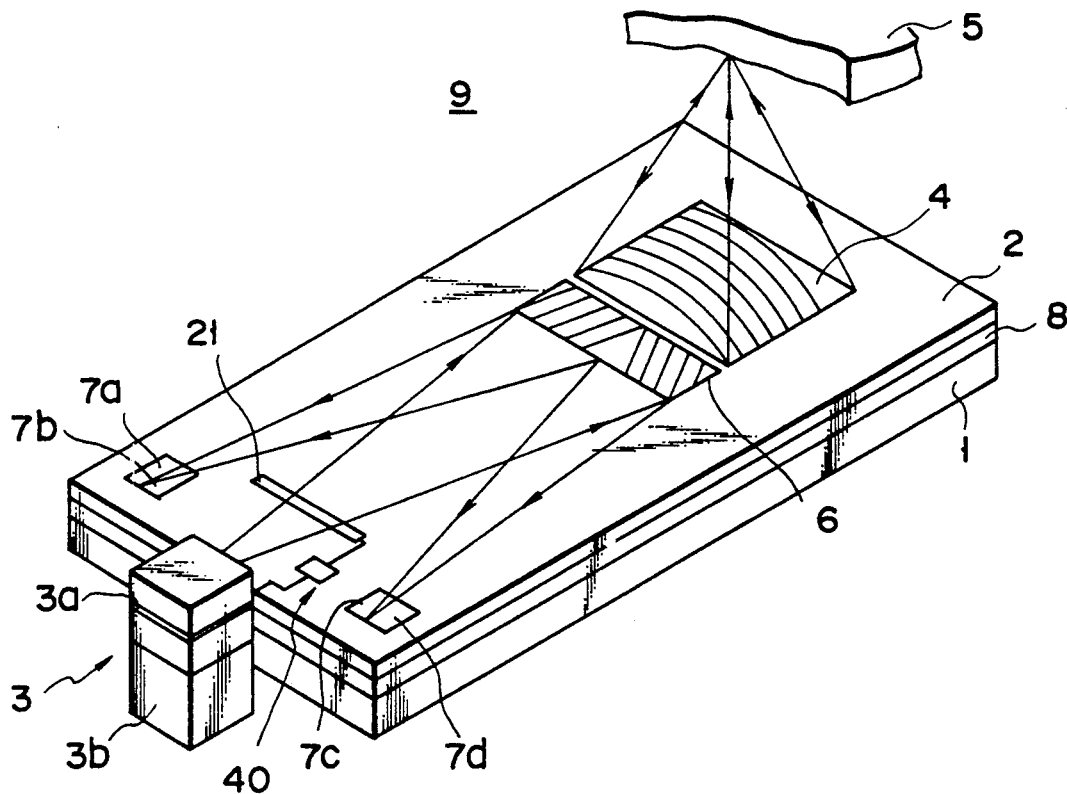
FIG. 4 is a perspective view showing a first embodiment of an integrated optical pickup of the present invention.

FIG. 4 is a perspective view showing a first embodiment of the present invention.

On an Si substrate 1, there is formed an $SiO_2$ buffer layer 8 which is formed by thermally oxidizing the surface of Si substrate 1 and is good quality. Also, $SiO_2$ has a refractive index of 1.46 to 1.47. Corning #7059 glass having a refractive index of 1.55 is deposited on the surface of the buffer layer 8 by sputtering, whereby an optical waveguide 2 is formed. The optical waveguide 2 is shaped in a form of a thin film having a thickness of about 1 micron. On the optical waveguide 2, there are formed a beam splitter 6 and a grating coupler 4 in its rear end side. Light receiving elements 7a, 7b and 7c, 7d, which are respectively divided into two, are formed on both right and left sides of the front end portion on the Si substrate 1. On the front edge portion of the optical waveguide 2, there is arranged a semiconductor laser 3, which is fixed to a support member 3b. A thickness of an active layer 3a of the laser 3 is about 0.1 micron.

On the substrate 1, there are formed an auto power control (APC) circuit 40 between the light receiving elements 7a, 7b and 7c, 7d formed in the front end portion, and a light receiving element 21 receiving a laser beam emitted from the semiconductor laser 3. The light receiving element 21 is formed just before the semiconductor laser 3 in a thin and long pattern in the right and left direction in order that all laser beams emitted radically from the semiconductor laser 3 can be received.

The APC circuit 40 and the light receiving element 21 can be formed by a fine processing technique in which the general semiconductor integrated circuit is manufactured.

Figure 5:
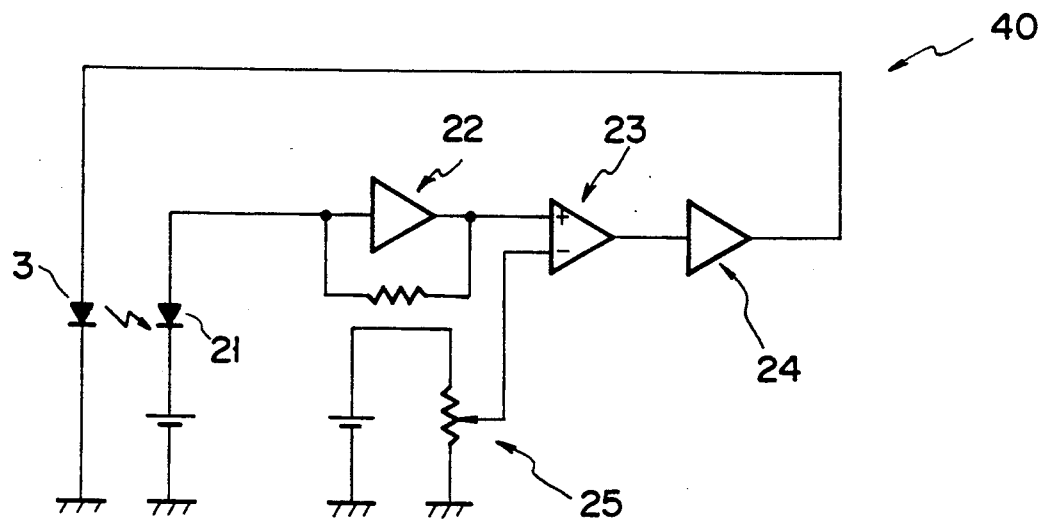
FIG. 5 is a view showing the structure of an APC circuit, which is used in the optical pickup shown in FIG. 4.

The APC circuit 40 is structured as shown FIG. 5. A part of the laser beam emitted into the optical waveguide 2 from the semiconductor laser 3 is detected by the light receiving element 21. A power supply is connected to the light receiving element 21 and current is supplied to a current/voltage conversion circuit 22 in accordance with the quantity of emitted light. The output voltage, which is sent from the current/voltage conversion circuit 22, is supplied to a non-inverting input terminal of a voltage comparator 23. Also, a comparative reference voltage, which is fixed to a predetermined voltage by a comparative reference voltage source 25, is supplied to an inverting input terminal of the voltage comparator 23. The output voltage, which is sent from the voltage comparator 23, is supplied to a voltage/current conversion circuit 24. The output current from the circuit 24 is fed back to the semiconductor laser 3.

The principle with which the light receiving element 21 receives a waveguide light in the optical waveguide 2 is as follows.

The optical waveguide 2 is arranged on the buffer layer 8 formed on the substrate 1, and has boundary surfaces contacting with the buffer layer 8 and an air layer 9. The buffer layer 8 and the air layer 9 are lower than the optical waveguide (layer) 2 in their refractive index. Due to this, the laser beam emitted from the semiconductor laser is transmitted through the optical waveguide layer 2 as the total reflection is repeated at the boundary surfaces. At this time, the laser beam is transmitted through the optical waveguide layer 2 as a part of the laser beam leaks into the buffer layer 8 and the air layer 9. In order that light leaked into the buffer layer 8 passes through the buffer layer and reaches to the surface of the substrate, the light receiving element 21 formed on the surface of the substrate can receive light.

The function of the pickup and the function of the APC circuit 40 in this embodiment will be explained with reference to FIGS. 4 and 5.

The laser beam emitted from semiconductor laser 3 is incident into the optical waveguide 2 from the end surface thereof and transmitted therein as the total reflection is repeated at the boundary surfaces between the air layer 9 and the buffer layer 8. A part of the laser beam to transmit in the optical waveguide 2 is detected by the light receiving element 21. On the other hand, the laser beam, which was not detected by the light receiving element 21, is converged to a track of an optical recording medium 5 through the beam splitter 6 and the grating coupler 4. Then, reflected light having data from the recording medium 5 is detected by the light receiving elements 7a to 7d as the total reflection is repeated in the optical waveguide 2 through the grating coupler 4 and the beam splitter 6.

In the optical pickup, a focusing control and a tracking control are performed based on the signals detected by the respective light emitting elements 7a to 7d. It is assumed that the signals obtained by the respective light receiving elements are 7a, 7b, 7c, and 7d, respectively.

A focus error signal can obtained from $(7b+7c)$ $(7a+7d)$, and a track error signal can be obtained from $(7a+7b)-(7c+7d)$. Data signal from the recording medium 5 can be obtained from $(7a+7b)+(7c+7d)$.

On the other hand, in accordance with the amount of receiving light by the light receiving element 21, current flows to the current/voltage conversion circuit 22. The current is voltage-converted by the current/voltage conversion circuit 22 and compared with the reference voltage by the voltage comparator 23. The reference voltage is fixed in advance in order to obtain the sufficient amount of light converged to the recording medium. In a case where the reference voltage and the voltage-converted voltage are different from each other, the output of the voltage comparator 23 works in a direction where a voltage difference is controlled. The output voltage is current converted by the voltage/current conversion circuit 24, and fed back to the semiconductor laser 3. Thereby, the quantity of light, which the light receiving element 21 receives, that is, the quantity of light of the semiconductor laser 3, is controlled to be constant.

Therefore, if the reference voltage, which is necessary for obtaining the constant quantity of light in advance, is fixed, it is possible to allow a fixing positional error against the optical waveguide 2 of the semiconductor laser 3 to a certain degree. Moreover, even if the quantity of light emitted from the semiconductor laser 3 changes responsive to a change of temperature, this can be corrected immediately.

If the case in which the APC circuit 40 is provided is compared with the case in which the APC circuit 40 is not provided, the following result can be obtained.

In this case, it is assumed that $\Lambda=0$ μm, and the amount of La is increased. The maximum gain of the APC circuit is +6 dB. In the case in which the APC circuit is provided, the coupling efficiency can be maintained to be 100% until the coupling efficiency reduces to 50% in the case in which the APC circuit is not provided. Thereafter, the coupling efficiency reduces together with an increase in La. However, if the coupling efficiency of 90% is a system allowable value, a distance error allowable value of La extends from 0–0.8 μm to 0–5 μm.

As mentioned above, since the APC circuit is provided and the intensity of the laser beam emitted from the semiconductor laser is controlled, it is possible to obtain a laser beam having a constant intensity even if the coupling between the semiconductor laser and the optical waveguide is not strictly performed. Due to this, it is possible to improve the degree of the allowable positioning error against the optical waveguide of the semiconductor laser, thereby reducing difficulty of manufacturing the optical pickup. Moreover, the intensity of emission of the laser beam of the optical pickup can be maintained constantly, thereby making it possible to obtain stable recording and reproducing characteristics.

Figure 6:
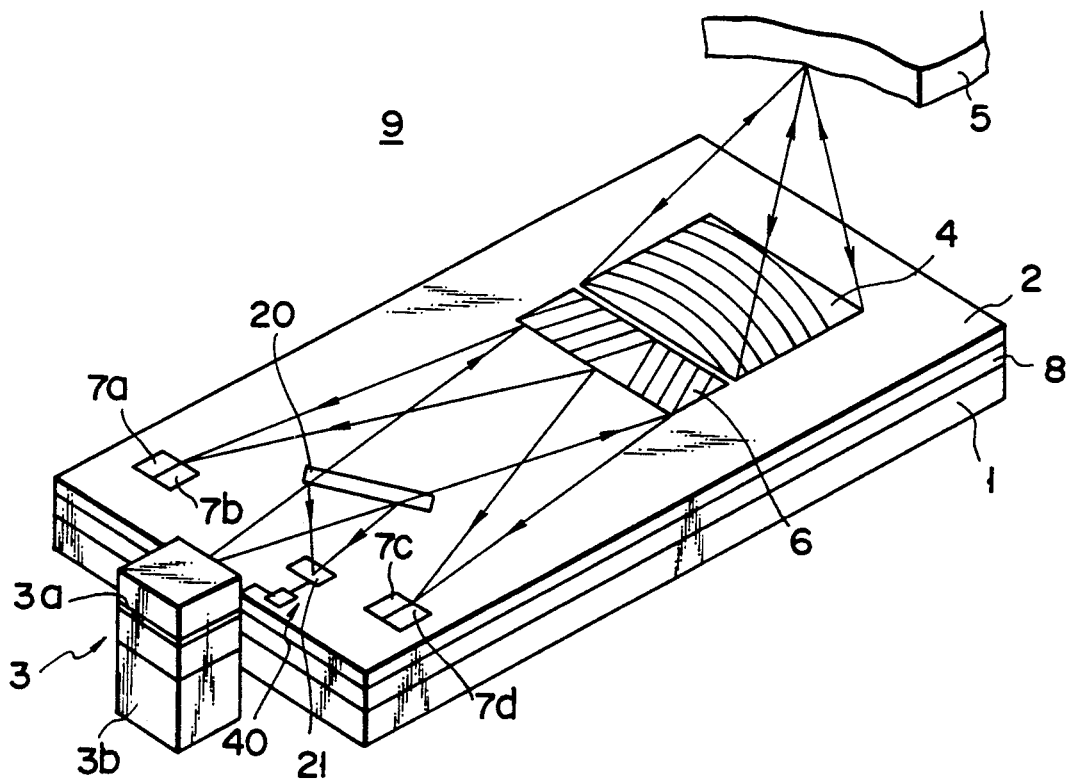
FIG. 6 is a perspective view showing a modification of the optical pickup shown in FIG. 4.

The present invention is not limited to the above-mentioned embodiment. The present invention can be structured as shown in, for example, FIG. 6. In this figure, the same reference numerals as those of the first embodiment are used to designate the same portions as those of the first embodiment. In this modification, a further beam splitter 20 is formed in the optical waveguide 2 between the beam splitter 6 and the semiconductor laser 3. The beam splitter 20 is formed such that the laser beam emitted from the active layer 3a of the semiconductor laser 3 is directed to the beam splitter 6 and the receiving element 21. Even if the further beam splitter 20 is provided and the laser beam is guided to the light receiving element 21, the same effect as the first embodiment can be obtained.

FIG. 7 shows a second embodiment of the integrated pickup relating to the present invention. In FIG. 7, the same reference numerals as those of the first embodiment are used to designate the same portions as those of the first embodiment. Also, since the optical recording medium is arranged at the same position as the position of the first embodiment, the optical recording medium is omitted. Moreover, similar to the first embodiment, the APC circuit 40 is formed on the Si substrate 1 by the fine processing technique in which the general semiconductor integrated circuit is manufactured. In FIG. 7, the outline of the circuit is shown.

Figure 9A:
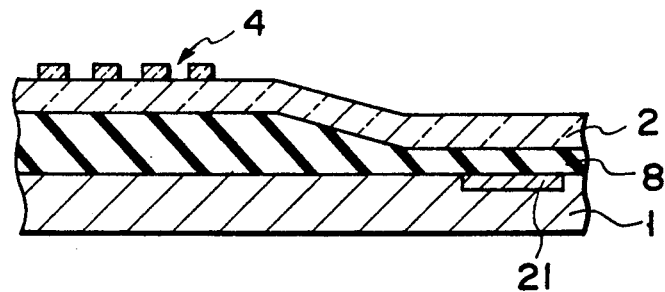
FIG. 9A is a view showing the structure of a light receiving element for monitoring the quantity of light of the waveguide light.

In the second embodiment, as shown in FIG. 9A, the buffer layer 8, which is back in the grating coupler 4 is taper-formed to be thinner as the buffer layer 8 advances backward. The light receiving element 21, which detects the waveguide light incident in the waveguide from the semiconductor laser 3, is formed in the portion where the buffer layer 8 on the Si substrate 1 becomes thin. The light receiving element 21 detects the waveguide light, which passed through the grating coupler 4.

FIG. 8 shows the optical pickup seen from the horizontal direction. If the optical waveguide light is incident in the grating coupler 4, a radiant mode couple is generated, and light is radiated outside of the optical waveguide. At this time, the waveguide light weakens as light is radiated, and the distribution of the quantity of radiated light gradually attenuates in accordance with the advancing direction of the waveguide light as shown in the graph of FIG. 8. Then, an inclination $\alpha$ of attenuation is called a radiation loss coefficient. As the value of the efficiency becomes larger, the quantity of attenuation per a unit length becomes larger. Generally, in the optical pickup, the beams having even intensity must be applied to the recording medium in terms of recording and reproducing and the inclination $\alpha$ cannot be largely set. Due to this, the corresponding quantity of light, serving as a waveguide light passes through the grating coupler 4 and is transmitted.

Figure 9B:
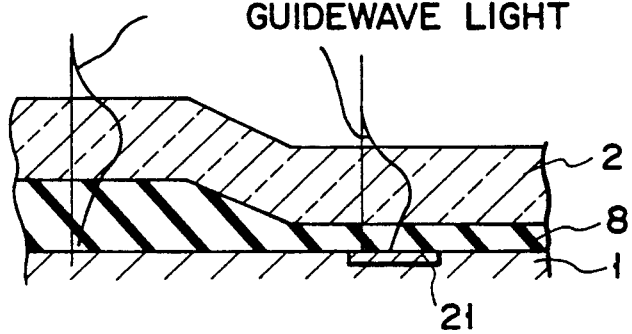
FIG. 9B is a view showing the respective distributions of waveguide light intensity at the portion where the thickness of a buffer layer is different.

FIG. 9B is a view showing the relationship of the distribution between the thickness of the buffer layer 8 and the distribution of the waveguide light. As is shown in the drawing, in the portion where the thickness of the buffer layer 8 is larger, intensity the of the waveguide light on the Si substrate 1 weakens. In other words, if the light receiving element is provided in the thick portion of the buffer layer 8 on the Si substrate 1, the light receiving element can detect only slight leakage light. However, in the thin portion of the buffer 8, the intensity of the waveguide light is not decreased so much, as shown in FIG. 9B. Therefore, if the light receiving element is formed in the portion where the buffer layer is thin, leakage light can be sufficiently detected. As mentioned above, in this embodiment, the buffer layer 8 where the light receiving element 21 is provided is formed to be thin. As a result, since the light receiving element 21 can detect sufficient leakage light, a waveguide light monitoring having a good S/N ratio can be performed.

Moreover, since transmitted light, which passes through the grating coupler 4, is not originally used as radiation light, the radiation efficiency does not decrease in the grating coupler 4 even if such waveguide light is guided.

Additionally, it can be considered that the buffer layer 8, which is provided in the front of the beam splitter 6, is formed thin and the light receiving element 21 is provided in the portion of the thinner portion of the buffer layer 8. Then, since the light receiving element can absorb a great amount of light, the waveguide light monitoring having a further improved S/N ratio can be performed. However, since the quantity of light, which is incident in the grating coupler 4 is considerably decreased by that light that the light receiving element absorb, in general, it cannot be said that such a technique is favorable.

Figure 10:
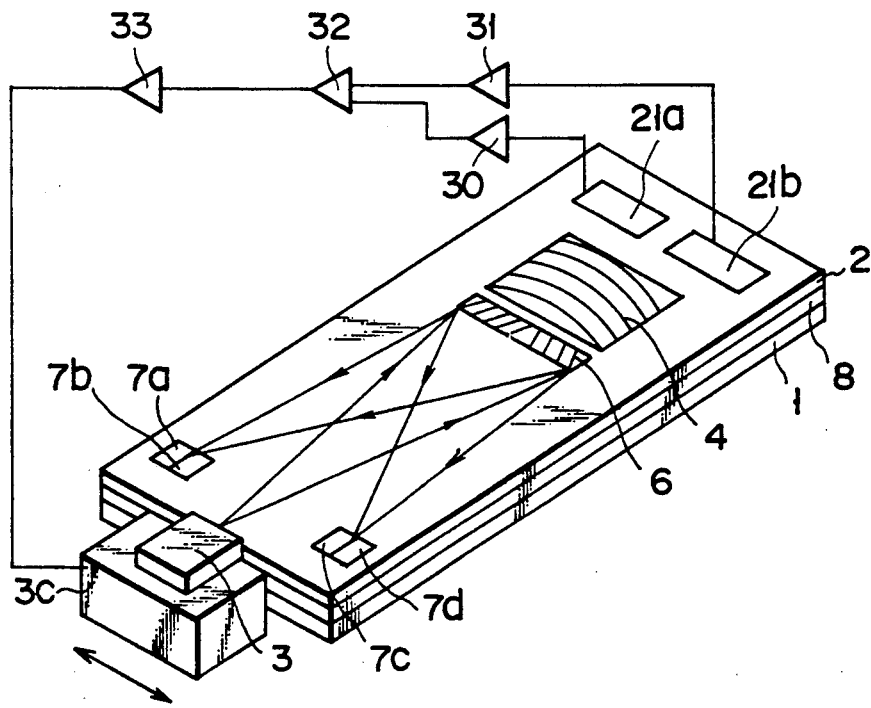
FIG. 10 is a perspective view showing a third embodiment of the integrated optical pickup of the present invention.

An object of the present invention is to improve the allowable degree of positioning error against the optical waveguide of the semiconductor laser when the semiconductor laser is fixed to the end surface of the optical waveguide. To attain such an object, FIG. 10 shows a further suitable embodiment.

The semiconductor laser 3 is provided on a stage 3c, which is movable in a direction of an arrow. Also, on the substrate 1, there is formed light receiving elements 21a, 21b, which are respectively divided into two, for monitoring the quantity of the waveguide light. The positions and the structure of the light receiving elements 21a and 21b are the same as the case of the second embodiment. The optical current detected by the light receiving element 21a is voltage-converted by the current/voltage conversion circuit 30, and the optical current detected by the light receiving element 21b is voltage-converted by the current/voltage conversion circuit 31. The output signals of the respective circuits 30 and 31 are input to a comparator 32, and a differential signal is output from the comparator 32. The differential signal is fed back to a stage driving circuit 33, thereby controlling the drive of the movable stage 3c. If the quantity of the receiving light of the receiving light element 21a and that of the light receiving element 21b become completely the same, the drive of the stage 3c is stopped.

In the above-described first and second embodiments, the degree of the allowable positioning error in the upper and lower directions and in the contact direction can be improved in coupling the semiconductor laser to the optical waveguide. According to the structure of this further embodiment, the degree of the allowable positioning error in the right and left directions can be improved in coupling the semiconductor laser to the optical waveguide.

The present invention was explained based on the disclosed embodiments. However, the present invention is not limited to the above-mentioned embodiments, and various modifications can be made. For example, the APC circuit may be further provided in the optical pickup shown in FIG. 10, whereby the output variation of the laser beam due to a change of temperature may be immediately corrected.

What is claimed is:

1. An optical pickup comprising:
    a substrate;
    light propagation means formed on said substrate for propagating a light;
    a semiconductor laser attached to said light propagation means to emit a laser beam light into the light propagation means;
    diffraction means, provided in said light propagation means, for diffracting waveguide light emitted from said semiconductor laser and propagating through said light propagation means so that the diffracted laser beam is converged to an optical recording medium arranged at the outside of said light propagation means;
    first light detection means, formed on said substrate, for detecting a returned light which is reflected back from said optical recording medium and which propagates through said light propagation means;
    second light detection means, formed on said substrate, for detecting the intensity of said waveguide light between said semiconductor laser and said diffraction means, said waveguide light propagating through said light propagation means, said second light detection means generating an intensity signal corresponding to the detected intensity of said waveguide light; and
    control means for controlling a quantity of laser beam light emitted from said semiconductor laser based on the intensity signal generated by said second light detection means.

2. The optical pickup according to claim 1, wherein said first light detection means is arranged on a same end of said substrate as said semiconductor laser.

3. The optical pickup according to claim 2, wherein said control means comprises a control circuit maintaining the quantity of said laser beam emitted from said semiconductor laser to be constant.

4. The optical pickup according to claim 3, wherein said control circuit is formed on said substrate.

5. The optical pickup according to claim 1, wherein said diffraction means comprises a single diffraction element.

6. An optical pickup comprising:
    a substrate;
    an optical waveguide formed on said substrate and having an end surface;
    a semiconductor laser movably attached along said end surface of said optical waveguide to emit a laser beam into said optical waveguide;
    diffraction means, provided in said optical waveguide, for diffracting the laser beam propagating through said optical waveguide so that the diffracted laser beam is converged to an optical recording medium arranged at the outside of said optical waveguide;

first light detection means, formed on said substrate, for detecting a returned light which is reflected from said optical recording medium and which propagates in said optical waveguide;

second light detection means, formed on said substrate, for detecting an intensity of said waveguide light propagating through said optical waveguide and for generating an intensity signal corresponding to the detected intensity; and control means for controlling a position of said semiconductor laser based on the intensity signal generated by said second light detection means.

7. The optical pickup according to claim 4, wherein:

said second light detection means comprises a light detector which is divided into two divided light detectors; and said control means comprises a comparator for comparing signals sent from said divided light detectors, respectively.

* * * * *